United States Patent [19]

Rothe

[11] Patent Number: 4,815,834
[45] Date of Patent: Mar. 28, 1989

[54] OBJECTIVE OF GREAT OVERALL LENGTH

[75] Inventor: Ernst Rothe, Munich, Fed. Rep. of Germany

[73] Assignee: Optische Werke G. Rodenstock, Munich, Fed. Rep. of Germany

[21] Appl. No.: 91,398

[22] Filed: Aug. 31, 1987

[30] Foreign Application Priority Data

Aug. 30, 1986 [DE] Fed. Rep. of Germany ....... 3629653

[51] Int. Cl.$^4$ .............................................. G02B 9/62
[52] U.S. Cl. ...................................... 350/464; 350/463
[58] Field of Search ......................... 350/463, 464, 465

[56] References Cited

U.S. PATENT DOCUMENTS 2,989,895  6/1961  Sandback ............................. 350/464
3,106,598  10/1963  Buzawa ............................... 350/464

Primary Examiner—Bruce Y. Arnold
Assistant Examiner—Terry S. Callaghan
Attorney, Agent, or Firm—Antonelli, Terry & Wands

[57] ABSTRACT

An objective of great overall length having two lens groups with a positive lens power and an aperture disposed in front of or within of the first lens group. The first lens group includes a positive lens and a negative lens. The second lens group has at least four lens components with lens powers of positive, negative, positive and negative, respectively the distance between the two lens groups being greater than the focal length of the objective. Additionally, the lens components of the second lens group satisfy the following conditions:

$R_{21} < f$ $R_{26} < f/2$ $-R_{29} < f$ wherein $R_{21}$ is the radius of curvature of the front surface of the first lens component;

$R_{26}$ is the radius of curvature of the back surface of the second lens component;

$R_{29}$ is the radius of curvature of the front surface of the fourth element lens component; and f is the focal length of the objective.

18 Claims, 1 Drawing Sheet

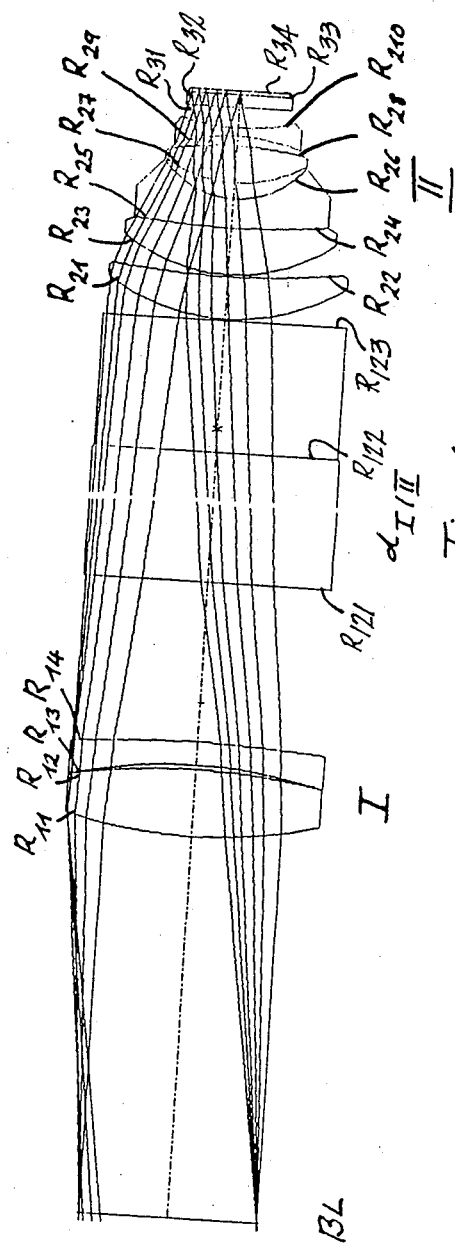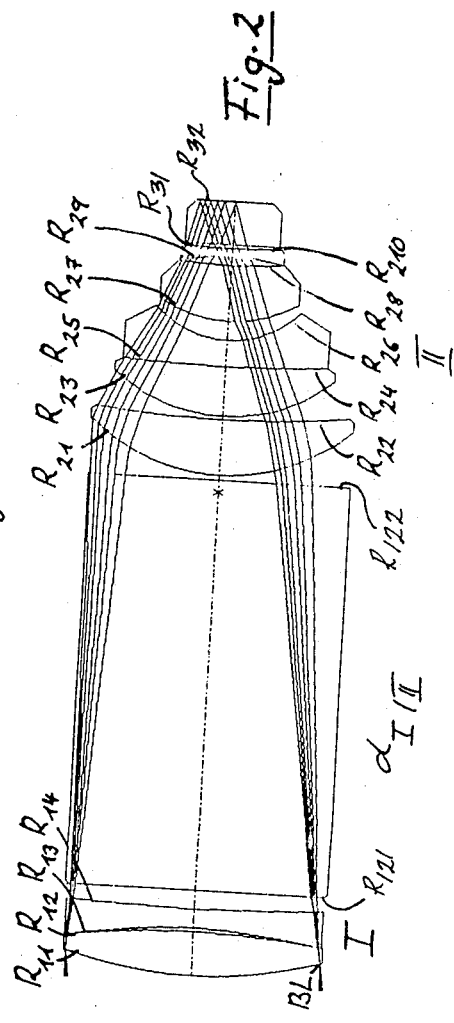

OBJECTIVE OF GREAT OVERALL LENGTH

BACKGROUND OF THE INVENTION

The present invention relates to an objective of great or large overall length, i.e., of an objective whose overall length is substantially greater than the focal length of the objective.

Such objectives are required among other things to attain, under special mounting conditions, by way of illustration, large aperture ratios, i.e., the aperture number is less than 2.

Objectives of great overall length having such a low aperture number which achieve good imaging performance and are of simple construction have hitherto been unknown.

It is therefore an object of the present invention to provide an objective of great overall length having a low aperture number which achieves good imaging performance and is of simple optical construction.

SUMMARY OF THE INVENTION

According to the present invention, the objective is distinguished by a combination of the following features:

(A) The present objective is provided with two lens groups of positive lens power. On the one hand, this enables the great overall length to be obtained and, on the other hand, it permits the distribution of the lens power to lens groups with solely positive lens power in such a manner that each lens group does not have to have too large a lens power.

(B) An aperture is placed in or before the first lens group so that the aperture ratio or a low aperture number F can be attained even under unfavorable mounting conditions such in X-ray screening, or the like.

(C) The first lens group is an achromatic lens component formed by a positive and a negative lens which simplifies the construction on the one hand and, on the other hand, it ensures that no "great" chromatic aberrations can occur, which would naturally have particular consequences owing to a large distance between the first and the second lens group, the distance between the first and second lens groups being greater than the focal length of the objective.

(D) The second lens group is provided with at least four lens components, whose lens power is "positive, negative, positive and negative", thereby making it possible to greatly curve the individual surfaces having a positive surface lens power, in such a manner that the surfaces are able to contribute considerably to correcting the individual aberration errors such as spherical aberration, coma and astigmatism. Simultaneously, it is possible to also introduce comparatively curved surfaces having a negative surface lens power, which also contribute considerably among other things to the flatness of image field. Further, the lenses of the second group fulfill the following equations of conditions which contribute significantly to correcting the different aberration errors:

$R_{21} < f$ $R_{26} < f/2$ $-R_{29} < f$ with $R_{21}$ being the radius of curvature of the first front surface of the first lens component, $R_{26}$ being the radius of curvature of the second or back surface of the second lens component, $R_{29}$ being the radius of curvature of the first or front surface of the fourth lens component, and f being the focal length of the objective.

By adhering to such equations of condition, the different aberration errors can be evenly compensated for on the individual surfaces.

In accordance with another feature of the present invention, to obtain improved correction of aberration errors, the first lens component, in optical alignment, of the second lens group is split into or composed of two lenses ($R_{21}$, $R_{22}$, $R_{23}$, $R_{24}$) with positive lens power whose surfaces fulfill the following equations of condition:

$R_{22} > 2 \cdot f$ $R_{23} < 2 \cdot f/3$ $R_{24} > 2 \cdot f$ with $R_{22}$ being the radius of curvature of the second or back surface of the first lens $R_{23}$ being the radius of curvature of the first or front surface of the second lens, and $R_{24}$ being the radius of curvature of the second or back surface of the second lens.

Also, according to further features of the present invention, the second lens group has the third element lens satisfying the relation that $R_{27} \approx f/2$, with $R_{27}$ being the first or front surface of the third component lens. Further, the second lens group satisfies the relation that: $R_{21} > R_{23} > R_{26}$. Additionally, the first and second lens components of the second lens group are cemented together (cement surfaces $R_{24}$, $R_{25}$). Furthermore, the first or front surface ($R_{13}$) of the negative lens of the first lens group is a concave surface. In this manner, correction of the aberration errors in the case of a large aperture ratio is facilitated. Also, the aforementioned equations of condition facilitate the distribution of the correction loads for the different aberration errors on the individual surfaces.

BRIEF DESCRIPTION OF THE DRAWINGS

FIG. 1 illustrates a lens cross-section of a first embodiment in accordance with the present invention; and FIG. 2 illustrates a lens cross-section of a second embodiment in accordance with the present invention.

DETAILED DESCRIPTION OF THE PREFERRED EMBODIMENTS

The embodiments depicted in FIGS. 1 and 2 show conformly a first lens group I and a second lens group II each having positive lens power. The distance $d_{I/II}$ between the two lens groups I and II is greater than the focal length. It is possible and realized in both embodiments to insert one (FIG. 2) or several (FIG. 1) plane parallel plates or glass blocks in the "airspace" between the two lens groups and/or in the "airspace" between the last lens and the focal plane. The plates can be identified in the following Tables I and II by "infinite radius of curvature".

The first lens group I, in or before (in optical alignment) in which the aperture is situated, consists of a positive and a negative lens forming an achromatic lens component. The surfaces of the first lens group are designated with $R_{1i}$ (i=1...4), and the distances in the first lens group are given in the following tables.

The second lens group II is composed of four lens components in which the first lens component in the illustrated embodiments is formed by two lenses with positive lens power. The surfaces of the individual lenses are designated correspondingly with $R_{2i}$ (i=1 to 10) and the distances are given in the following tables.

The following Tables I and II respectively provide the radii of curvature R, the lens thicknesses or airspace d (rounded off in mm), the refraction indices of the lenses employed, as well as the glass number according to Schott, for the two illustrated embodiments of the present invention.

TABLE I

First Embodiment (FIG.1)

| Surface | Radius | Lens Thickness/ Airspace | Glass Number | Index |
|---|---|---|---|---|
| $R_{11}$ | 127.72 | | | |
| | | 17.3 | 955 | 1.62 |
| $R_{12}$ | −190.41 | | | |
| | | 1.2 | | |
| $R_{13}$ | −137.74 | | | |
| | | 6.0 | 1856 | 1.7 |
| $R_{14}$ | −325.46 | | | |
| | | 41.0 | | |
| $R_{121}$ | infinite | | | |
| | | 34.0 | 407 | 1.52 |
| $R_{122}$ | infinite | | | |
| | | 34.0 | 407 | 1.52 |
| $R_{123}$ | infinite | | | |
| | | 0.5 | | |
| $R_{21}$ | 57.05 | | | |
| | | 11.0 | 2009 | 1.69 |
| $R_{22}$ | 229.58 | | | |
| | | 0.5 | | |
| $R_{23}$ | 46.81 | | | |
| | | 12.0 | 2009 | 1.69 |
| $R_{24}$ | 204.62 | cemented surface | | |
| $R_{25}$ | 204.62 | | | |
| | | 7.7 | 1855 | 1.77 |
| $R_{26}$ | 24.58 | | | |
| | | 4.0 | | |
| $R_{27}$ | 36.91 | | | |
| | | 9.3 | 2009 | 1.69 |
| $R_{28}$ | −100.00 | | | |
| | | 2.4 | | |
| $R_{29}$ | −56.03 | | | |
| | | 2.3 | 1507 | 1.58 |
| $R_{210}$ | 56.84 | | | |
| | | 5.4 | | |
| $R_{31}$ | infinite | | | |
| | | 3.2 | 105 | 1.49 |
| $R_{32}$ | infinite | | | |
| | | 0.2 | | |
| $R_{33}$ | infinite | | | |
| | | 0.9 | 651 | 1.51 |
| $R_{34}$ | infinite | | | |
| | | 0.03 | | |

Focal plane
Focal length f = 87.51   Aperture number F = 1.86
Overall length of the objective from the aperture to the focal plane: 292.9

TABLE II

Second Embodiment (FIG. 2)

| Surface | Radius | Lens Thickness/ Airspace | Glass Number | Index |
|---|---|---|---|---|
| $R_{11}$ | 114.11 | APERTURE | | |
| | | 11.7 | 2022 | 1.65 |
| $R_{12}$ | −238.65 | | | |
| | | 1.0 | | |
| $R_{13}$ | −161.86 | | | |
| | | 5.0 | 1802 | 1.65 |
| $R_{14}$ | 500.75 | | | |
| | | 5.0 | | |
| $R_{121}$ | infinite | | | |
| | | 105.7 | 902 | 1.61 |
| $R_{122}$ | infinite | | | |
| | | 1.1 | | |
| $R_{21}$ | 51.88 | | | |
| | | 14.3 | 2009 | 1.69 |
| $R_{22}$ | 266.16 | | | |
| | | 0.9 | | |
| $R_{23}$ | 45.00 | | | |
| | | 12.8 | 2009 | 1.69 |
| $R_{24}$ | 384.39 | | | |
| | | 0.01 | | |
| $R_{25}$ | 387.12 | | | |
| | | 6.8 | 1855 | 1.77 |
| $R_{26}$ | 26.12 | | | |
| | | 5.0 | | |
| $R_{27}$ | 34.00 | | | |
| | | 14.7 | 2009 | 1.69 |
| $R_{28}$ | 176.20 | | | |
| | | 2.4 | | |
| $R_{29}$ | −54.84 | | | |
| | | 2.0 | 1856 | 1.79 |
| $R_{210}$ | 337.33 | | | |
| | | 1.2 | | |
| $R_{31}$ | infinite | | | |
| | | 11.3 | 707 | 1.51 |
| $R_{32}$ | infinite | | | |

Focal plane
Focal length f = 75.5   Aperture number F = 1.13
Overall length of the objective from the aperture to the focal plane: 200.1
(All measurements in the tables are in millimeters)

As is apparent, in each embodiment, the first lens group I includes lenses having surfaces $R_{11}$–$R_{14}$ and the second lens group II includes lenses having surfaces $R_{21}$–$R_{210}$. The aperture BL lies 100 mm before the first lens component surface in the first element embodiment (FIG. 1) and in the first lens surface in the second embodiment (FIG. 2). The first lens group I is an achromatic lens component formed by a positive lens ($R_{11}$, $R_{12}$) and a negative lens ($R_{13}$, $R_{14}$). The second lens group II in beam angle optical alignment features at least four lens component, the lens power of which is positive, negative, positive, negative and the distance dI/II between the first lens group I and the second lens group II is greater than the focal length f of the objective.

The lenses of the second lens group II fulfill the following equations of conditions.

$R_{21} < f$ $R_{26} < f/2$ $-R_{29} < f$ with
$R_{21}$ being the radius of curvature of the first or front surface of the first lens component,
$R_{26}$ being the radius of curvature of the second or back surface of the second element lens component,
$R_{29}$ being the radius of curvature of the first or front surface of the fourth element lens component, and
f being the focal length of the objective.

Additionally, the first lens component, in beam angle, of the second lens group II is split into or composed of two lenses ($R_{21}$, $R_{22}$, $R_{23}$, $R_{24}$) with positive lens power whose surfaces fulfill the following equations of condition:

$R_{22} > 2 \cdot f$ $R_{23} < 2 \cdot f / 3$ $R_{24} > 2 \cdot f$ with
- $R_{22}$ being the radius of curvature of the second or back surface of the first lens
- $R_{23}$ being the radius of curvature of the first or front surface of the second lens, and
- $R_{24}$ being the radius of curvature of the second or back surface of the second lens.

Also, the second lens group II has the third element lens satisfying the relation that $R_{27} \approx f/2$, with $R_{27}$ being the first or front surface of the third lens component. The second lens group also satisfies the relation that: $R_{21} > R_{23} > R_{26}$ and the first and second lens components of the second lens group are cemented together (cement surfaces $R_{24}$, $R_{25}$). Furthermore, the first or front surface ($R_{13}$) of the negative lens of the first lens group is provided as a concave surface.

The two embodiments show, by way of illustration, how it is possible to correct aberration errors when the overall length is great and a low aperture number by the aforesaid equations of condition according to the invention. As the correction load, which the individual surfaces of the objective have to carry, can readily be calculated from the given numerical data and therewith the particular correction principle being evident to those skilled in the art, it is not considered necessary to describe the same in more detail.

In particular, it is apparent to those skilled in the art that objectives whose data can differ substantially from those of the disclosed embodiments, but in which the correction measures are accomplished as in the disclosed embodiments, can be calculated without difficulty according to the disclosed information.

What is claimed is:

1. An objective lens system comprising first and second lens groups having a positive lens power, an aperture disposed in front of or within the first lens group and in optical alignment therewith, the first lens group being an achromatic lens group including a positive lens and a negative lens, the second lens group having at least first, second, third and fourth lens components with a lens power of positive, negative, positive and negative, respectively the distance between the two lens groups being greater than the focal length of the objective, and the components of the second lens group satisfying the following conditions:

$R_{21} < f$ $R_{26} < f/2$ $-R_{29} < f$ wherein
- $R_{21}$ is the radius of curvature of the front surface of the first lens component;
- $R_{26}$ is the radius of curvature of the back surface of the second lens component;
- $R_{29}$ is the radius of curvature of the front surface of the fourth lens component; and
- f is the focal length of the objective.

2. An objective according to claim 1, wherein $R_{27}$ is the radius of curvature of the front surface of the third lens component of the second lens group and $R_{27} \approx f/2$.

3. An objective according to claim 1, wherein the second lens component of the second lens group includes a positive lens element, $R_{23}$ is the radius of curvature of the front surface of the positive lens element of the second lens component, and $R_{21} > R_{23} > R_{26}$.

4. An objective according to claim 1, wherein the negative lens of the first lens group has a concave front surface.

5. An objective according to claim 1, wherein the objective has a length substantially greater than the focal length thereof.

6. An objective according to claim 1, wherein the first lens component of the second lens group includes a positive lens element and the second lens component of the second lens group includes a positive lens element, said first and second lens components of the second lens group satisfying the following conditions:

$R_{22} > 2f$ $R_{23} > 2f/3$ $R_{24} > 2f$ wherein,
- $R_{22}$ is the radius of curvature of the back surface of the first lens component;
- $R_{23}$ is the radius of curvature of the front surface of the positive lens element of the second lens component;
- $R_{24}$ is the radius of curvature of the back surface of the positive lens element of the second lens component.

7. An objective according to claim 6, wherein $R_{21} > R_{23} > R_{26}$.

8. An objective according to claim 6, wherein the second lens component of the second lens group further includes a negative lens element cemented to the back surface of the positive lens element of the second lens component.

9. An objective according to claim 6, wherein the negative lens of the first lens group has a concave front surface.

10. An objective according to claim 6, wherein $R_{27}$ is the radius of curvature of the front surface of the third lens component of the second lens group and $R_{27} \approx f/2$.

11. An objective according to claim 10, wherein the second lens component of the second lens group further includes a negative lens element cemented to the back surface of the positive lens element of the second lens component.

12. An objective according to claim 10, wherein the negative lens of the first lens group has a concave front surface.

13. An objective according to claim 10, wherein $R_{21} > R_{23} > R_{26}$.

14. An objective according to claim 13, wherein the negative lens of the first lens group has a concave front surface.

15. An objective according to claim 13, wherein the second lens component of the second lens group further includes a negative lens element cemented to the back surface of the positive lens element of the second lens component.

16. An objective according to claim 15, wherein the negative lens of the first lens group has a concave front surface.

17. An objective according to claim 16, wherein $R_{11}$ is the radius of curvature of the front surface of the positive lens of the first lens group, $R_{12}$ is the radius of curvature of the back surface of the positive lens of the first lens group, $R_{13}$ is the radius of curvature of the concave front surface of the negative lens of the first lens group, $R_{14}$ is the radius of curvature of the back surface of the negative lens of the first lens group, $R_{25}$ is the radius of curvature of the front surface of the negative lens element of said second lens component, $R_{28}$ is the radius of curvature of the back surface of the third lens component of the second lens group, $R_{210}$ is the radius of curvature of the back surface of the fourth lens component of the second lens group, $R_{121}$ and $R_{122}$ are the radii of curvature of the surfaces of a first glass plate located between said first and second lens groups, $R_{31}$ and $R_{32}$ are the radii of curvature of the surfaces of a second glass plate located behind the second lens group, $R_{123}$ is the radius of curvature of the back surface of a third glass plate located between said first and second lens groups, and $R_{23}$ and $R_{24}$ are the radii of curvature of the surfaces of a fourth glass plate located behind said second glass plate, the objective having the following characteristics with measurement being provided in millimeters:

| Surface | Radius | Lens Thickness/Airspace | Glass Number | Index |
|---|---|---|---|---|
| $R_{11}$ | 127.72 | | | |
| | | 17.3 | 955 | 1.62 |
| $R_{12}$ | −190.41 | | | |
| | | 1.2 | | |
| $R_{13}$ | −137.74 | | | |
| | | 6.0 | 1856 | 1.79 |
| $R_{14}$ | −325.46 | | | |
| | | 41.0 | | |
| $R_{121}$ | infinite | | | |
| | | 34.0 | 407 | 1.52 |
| $R_{122}$ | infinite | | | |
| | | 34.0 | 407 | 1.52 |
| $R_{123}$ | infinite | | | |
| | | 0.5 | | |
| $R_{21}$ | 57.05 | | | |
| | | 11.0 | 2009 | 1.69 |
| $R_{22}$ | 229.58 | | | |
| | | 0.5 | | |
| $R_{23}$ | 46.81 | | | |
| | | 12.0 | 2009 | 1.69 |
| $R_{24}$ | 204.62 | | | |
| | | cemented surface | | |
| $R_{25}$ | 204.62 | | | |
| | | 7.7 | 1855 | 1.77 |
| $R_{26}$ | 24.58 | | | |
| | | 4.0 | | |
| $R_{27}$ | 36.91 | | | |
| | | 9.3 | 2009 | 1.69 |
| $R_{28}$ | −100.00 | | | |
| | | 2.4 | | |
| $R_{29}$ | −56.03 | | | |
| | | 2.3 | 1507 | 1.58 |
| $R_{210}$ | 56.84 | | | |
| | | 5.4 | | |
| $R_{31}$ | infinite | | | |
| | | 3.2 | 105 | 1.49 |
| $R_{32}$ | infinite | | | |
| | | 0.2 | | |
| $R_{33}$ | infinite | | | |
| | | 0.9 | 651 | 1.51 |
| $R_{34}$ | infinite | | | |
| | | 0.03 | | |
| Focal plane | | | | |

Focal length f = 87.51  Aperture number F = 1.86
Overall length of the objective from the Aperture to the focal plane: 292.9.

18. An objective according to claim 16, wherein $R_{11}$ is the radius of curvature of the front surface of the positive lens of the first lens group, $R_{12}$ is the radius of curvature of the back surface of the positive lens of the first lens group, $R_{13}$ is the radius of curvature of the concave front surface of the negative lens of the first lens group, $R_{14}$ is the radius of curvature of the back surface of the negative lens of the first lens group, $R_{25}$ is the radius of curvature of the front surface of the negative lens element of the second lens component, $R_{28}$ is the radius of curvature of the back surface of the third lens component of the second lens group, and $R_{210}$ is the radius of curvature of the back surface of the fourth lens component of the second lens group, $R_{121}$ and $R_{122}$ are the radii of curvature of the surfaces of a first glass plate located between said first and second lens groups, $R_{31}$ and $R_{32}$ are the radii of curvature of the surfaces of a second glass plate located behind the second lens group, the objective having the following characteristics with measurement being provided in millimeters:

| Surface | Radius | Lens Thickness/Airspace | Glass Number | Index |
|---|---|---|---|---|
| $R_{11}$ | 114.11 | APERTURE | | |
| | | 11.7 | 2022 | 1.65 |
| $R_{12}$ | −238.65 | | | |
| | | 1.0 | | |
| $R_{13}$ | −161.86 | | | |
| | | 5.0 | 1802 | 1.65 |
| $R_{14}$ | 500.75 | | | |
| | | 5.0 | | |
| $R_{121}$ | infinite | | | |
| | | 105.7 | 902 | 1.61 |
| $R_{122}$ | infinite | | | |
| | | 1.1 | | |
| $R_{21}$ | 51.88 | | | |
| | | 14.3 | 2009 | 1.69 |
| $R_{22}$ | 266.16 | | | |
| | | 0.9 | | |
| $R_{23}$ | 45.00 | | | |
| | | 12.8 | 2009 | 1.69 |
| $R_{24}$ | 384.39 | | | |
| | | 0.01 | | |
| $R_{25}$ | 387.12 | | | |
| | | 6.8 | 1855 | 1.77 |
| $R_{26}$ | 26.12 | | | |
| | | 5.0 | | |
| $R_{27}$ | 34.00 | | | |
| | | 14.7 | 2009 | 1.69 |
| $R_{28}$ | 176.20 | | | |
| | | 2.4 | | |
| $R_{29}$ | −54.84 | | | |
| | | 2.0 | 1856 | 1.79 |
| $R_{210}$ | 337.33 | | | |
| | | 1.2 | | |
| $R_{31}$ | infinite | | | |
| | | 11.3 | 707 | 1.51 |
| $R_{32}$ | infinite | | | |
| Focal plane | | | | |

Focal length f = 75.5  Aperture number F = 1.13
Overall length of the objective from the aperture to the focal plane: 200.1.

* * * * *